(12) United States Patent
Bergman et al.

(10) Patent No.: US 10,394,936 B2
(45) Date of Patent: *Aug. 27, 2019

(54) VIEWING HIERARCHICAL DOCUMENT SUMMARIES USING TAG CLOUDS

(71) Applicant: International Business Machines Corporation, Armonk, NY (US)

(72) Inventors: Lawrence D. Bergman, Mount Kisco, NY (US); Robert A. Flavin, Yorktown Heights, NY (US); Ravindranath Konuru, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 13/670,267

(22) Filed: Nov. 6, 2012

(65) Prior Publication Data

US 2014/0129918 A1 May 8, 2014

(51) Int. Cl.
*G06F 16/36* (2019.01)
*G06F 17/21* (2006.01)

(52) U.S. Cl.
CPC .......... *G06F 17/218* (2013.01); *G06F 16/367* (2019.01)

(58) Field of Classification Search
CPC .................. G06F 17/30867; G06F 17/2247
USPC .......................................................... 715/234
See application file for complete search history.

(56) References Cited

U.S. PATENT DOCUMENTS 5,999,178 A * 12/1999 Hwang ................... G06F 9/468 715/787
2008/0092044 A1 4/2008 Lewis et al.
2008/0114573 A1 5/2008 Hsieh et al.
2008/0222095 A1* 9/2008 Il ..................... G06F 17/30616
2009/0132526 A1 5/2009 Park
2009/0265307 A1 10/2009 Reisman et al.
2010/0030752 A1* 2/2010 Goldentouch ..................... 707/3
2010/0070860 A1 3/2010 Alkov et al.
2010/0114907 A1* 5/2010 Kirby .............................. 707/748
2010/0131899 A1 5/2010 Hubert
2010/0229082 A1* 9/2010 Karmarkar et al. .......... 715/205
2010/0313118 A1 12/2010 Acquaviva
2011/0029873 A1 2/2011 Eseanu et al.
2011/0060983 A1 3/2011 Cai et al.

(Continued)

FOREIGN PATENT DOCUMENTS

EP 2136301 A1 12/2009

OTHER PUBLICATIONS

Abulaish et al., "Web Content Mining Approach for Tag Cloud Generation," Proceedings of the 13th International Conference on Information Integration and Web-based Applications and Services, pp. 52-59, Publication Date Dec. 5, 2011.*

(Continued)

*Primary Examiner* — Shawn S Joseph
(74) *Attorney, Agent, or Firm* — Daniel P. Morris; Otterstedt, Wallace & Kammer, LLP (57) ABSTRACT

Access is obtained to a hierarchically structured document having a plurality of hierarchical levels. For each of the hierarchical levels, a word list with a word count for each word included therein is obtained. For each of the hierarchical levels, a tag cloud based on a corresponding one of the word counts is created. At least one of the tag clouds is displayed in association with a label for a corresponding one of the hierarchical levels.

5 Claims, 6 Drawing Sheets

(56) References Cited

U.S. PATENT DOCUMENTS

2011/0258204 A1   10/2011   Hubbard et al.
2013/0145327 A1   6/2013    Rinearson et al.
2014/0088944 A1*  3/2014    Natarajan et al. .............. 703/13

OTHER PUBLICATIONS

The Daily Moe, "A (Very) Simple Method for Automatic Creation of Hierarchical Tag Clouds" available at http://dailymoe.blogspot.conn/2009/03/very-simple-method-for-automatic.html (Year: 2009).*
Collins et al.; "Parallel Tag Clouds to Explore and Analyze Faceted Text Corpora", VAST IEEE Symposium on, Oct. 12-13, 2009, pp. 91-98.
Xexeo et al.; "Differential Tag Clouds: Highlighting Particular Features in Documents", WI-IAT International Joint Conference on, Sep. 15-18, 2009, vol. 3, pp. 129-132.
IBM et al.; "Dynamic Aggregation of Conextual Information and Collaborative Practices Over Keywords Within a Content in an Application Window", IPCOM000198784D, Aug. 16, 2010.
IBM et al.; "Mouse-Over "Cloud" Contents Capture", IPCOM000153907D, Jun. 14, 2007.
Yusef Hassan-Monteroa,et al. "Improving Tag-Clouds as Visual Information Retrieval Interfaces". Intern'l Conf.on Multidisciplinary Information Sciences and Technologys. 2006.
Martin Halvey, et al. "An Assessment of Tag Presentation Techniques". WWW 2007 / Poster Paper p. 1313-1314 2007.
A.W. Rivadeneira, et al. "Getting Our Head in the Clouds:Toward Evaluation Studies of Tagclouds". CHI 2007 Proc. Tags, Tagging & Notetaking, 2007 p. 995-998.
C. Trattner "Querycloud: . . . Clouds" abstract Jun. 26, 2012 http://www.iadisportal.org/digital-library/querycloud-automatically-linking-related-documents-via-search-query-tag-clouds.
D. E. Egan, et al. "Formative design evaluation of superbook". abstract downloaded from http://dl.acm.org/citation.cfm?id=64790 on Jun. 26, 2012.
Kang et al., "Interactive Hierarchical Tag Clouds for Summarizing Spatiotemporal Social Contents," 2014 IEEE 30th International Conference on Data Engineering (ICDE), Mar. 31, 2014, pp. 1-12.
Anonymous, JunkCharts, "Tag clouds are histograms," 2005,available at http://junkcharts.typepad.com/junk_charts/2005/10/tag_clouds_are_.html, Oct. 2005, pp. 1-3.

* cited by examiner

VIEWING HIERARCHICAL DOCUMENT SUMMARIES USING TAG CLOUDS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to user interfaces and the like.

BACKGROUND OF THE INVENTION

There are a variety of current document summarization techniques. Entire documents may be summarized as a set of keywords, which can be viewed in a variety of ways including tag clouds. Documents may also be summarized via textual summaries. Tables of contents can be extracted, showing the hierarchical structure of the document. Tag clouds are a well-known way of summarizing documents.

SUMMARY OF THE INVENTION

Principles of the invention provide techniques for viewing hierarchical document summaries using tag clouds. In one aspect, an exemplary method includes the steps of obtaining access to a hierarchically structured document having a plurality of hierarchical levels; for each of the hierarchical levels, obtaining a word list with a word count for each word included therein; for each of the hierarchical levels, creating a tag cloud based on a corresponding one of the word counts; and displaying at least one of the tag clouds in association with a label for a corresponding one of the hierarchical levels.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

provide more information to the user than do current techniques;
provide context-dependent information to the user not possible with current techniques;
provide for multi-resolution browsing in ways not supported by current techniques.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

There are a variety of current document summarization techniques, which provide limited information to the user. Entire documents may be summarized as a set of keywords, which can be viewed in a variety of ways including tag clouds. Documents may also be summarized via textual summaries. Tables of contents can be extracted, showing the hierarchical structure of the document. Tag clouds are a well-known way of summarizing documents, but do not provide the hierarchical structure.

Advantageously, one or more embodiments provide a more complete view of the document than has heretofore been possible. One or more embodiments advantageously reveal the hierarchical structure of the document (keywords or summaries), as well as detail (table of contents). One or more embodiments advantageously retain a hierarchical structure, while providing summary detail at arbitrary levels of the document structure. One or more embodiments provide the ability to seamlessly navigate from a summary view to the source document via in-context viewing of summary information.

Furthermore, one or more embodiments provide techniques for using hierarchically extracted keyword sets, visualized via tag clouds, to provide different document summary levels of detail of, and optionally to provide in-context viewing of the extracted sets.

Figure 1:
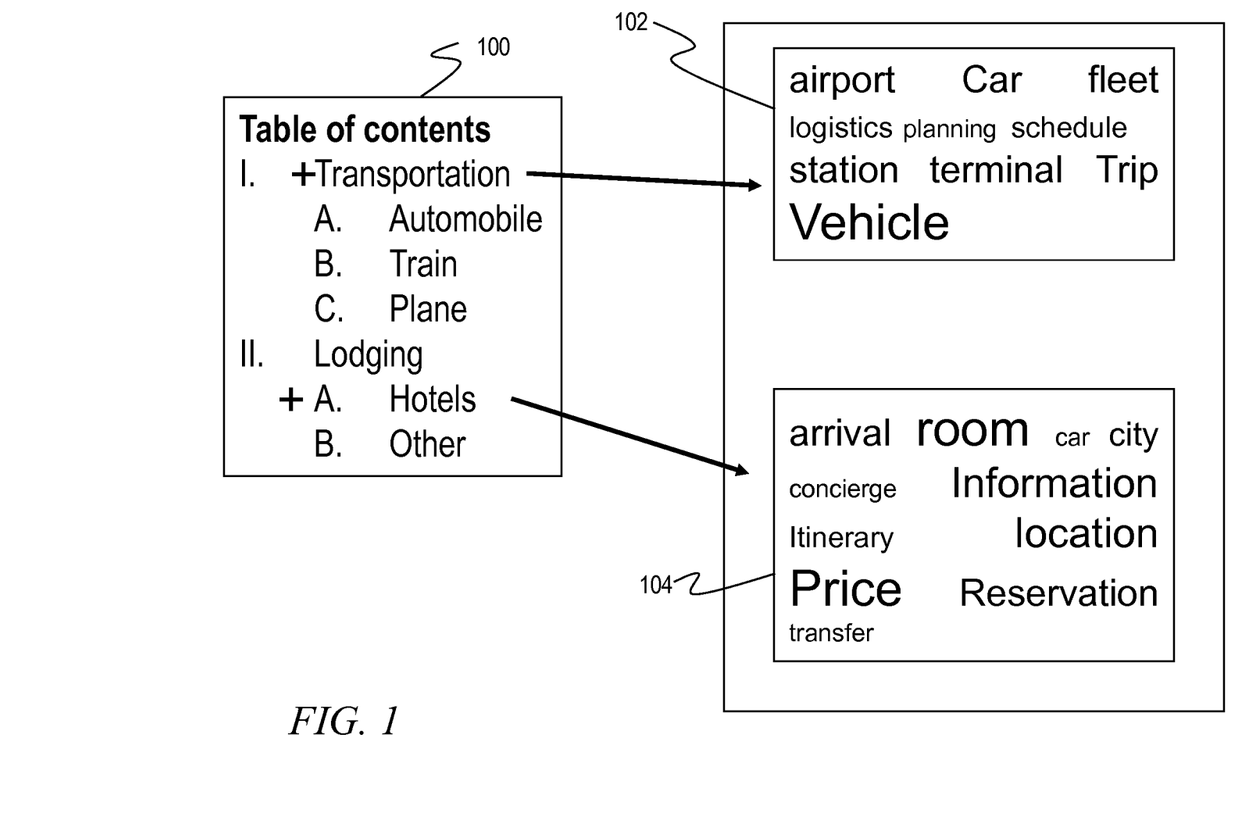
FIG. 1 shows an example of hierarchical tag clouds extracted from a document.

Referring now to FIG. 1, depicted therein is an example of hierarchical tag clouds extracted from a document. The figure shows the table of contents 100 associated with the document, and tag clouds 102, 104 associated with two different items in the table of contents (tag cloud 102 associated with "Transportation" and tag cloud 104 associated with "Hotels"). Hierarchical structure of the document is determined using any of a variety of existing methods for performing such document segmentation. Methods include using header styles, indentation, and/or bullet or numbering schemes. Once the hierarchical structure has been determined, keywords are extracted from each level of the hierarchy, and associated with the corresponding document block. This provides a hierarchically nested set of keyword groups.

Figure 2:
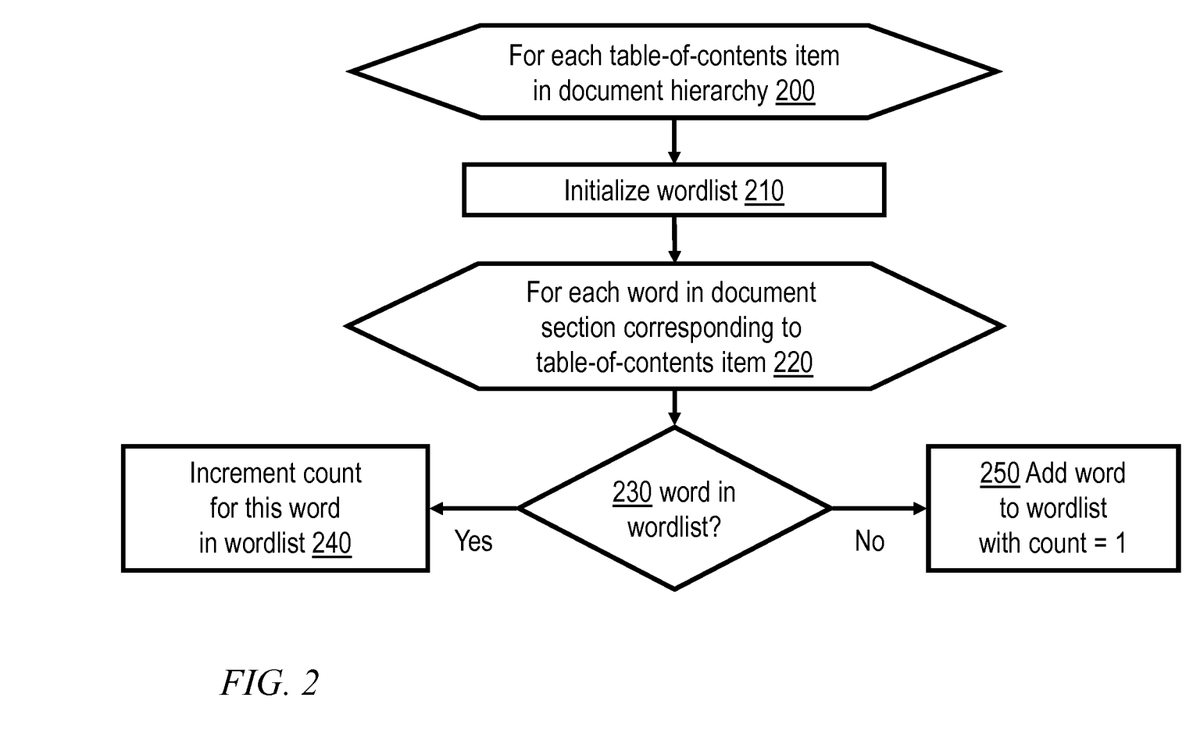
FIGS. 2 and 3 show an exemplary method for extracting keyword groups and an exemplary method for creating a tag cloud from a keyword group.
Figure 3:
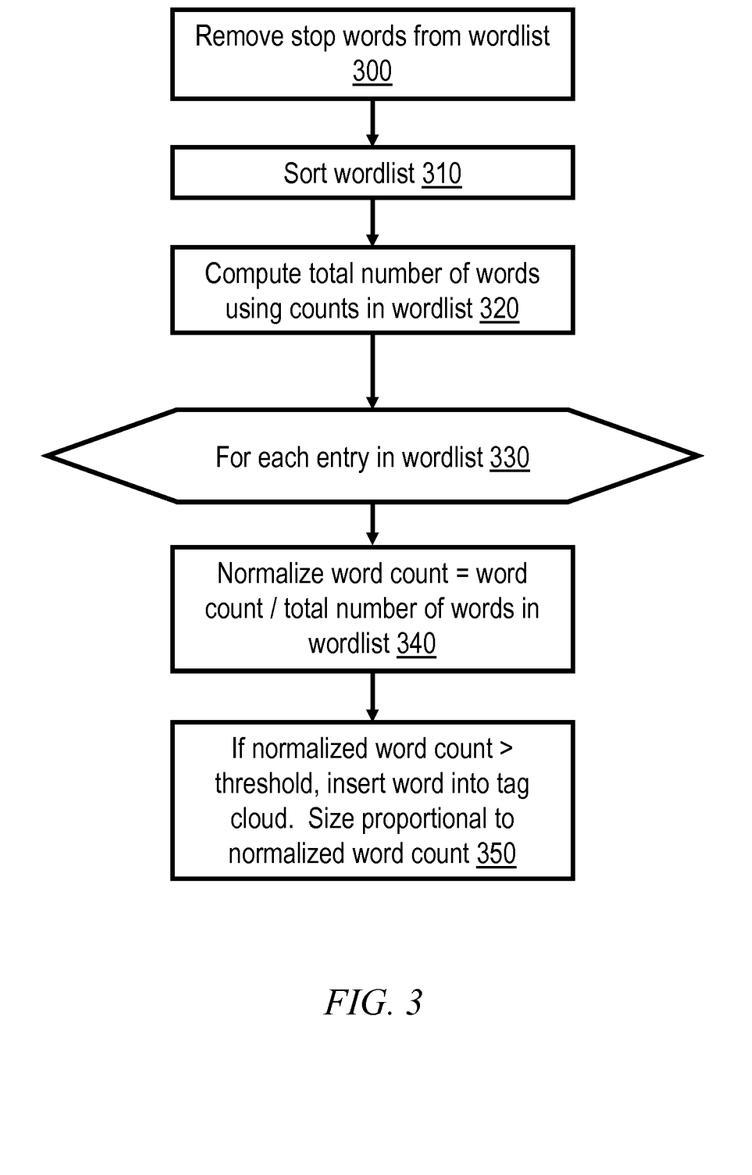

Refer now to FIGS. 2 and 3 which show an exemplary method for extracting keyword groups (steps 200-320) and an exemplary method for creating a tag cloud from a keyword group (steps 330-350). Each level of the hierarchy is processed independently (although optimizations that capitalize on nesting structure are, of course, possible). Referring to loop symbol 200, for each table-of-contents entry, an empty wordlist is created in step 210. The wordlist is a data structure which contains a list of words, with a word count associated with each word. The section of the document associated with this table-of-contents entry is then processed, one word at a time, as seen at loop symbol 220. A check is performed in decision block 230 to see if this word is in the wordlist. If it is, as per the "Yes" branch of block 230, the count for this word is incremented in step 240. If the word is not in the wordlist, as per the "No" branch of block 230, it is added to the wordlist with an associated count of one, in step 250.

Entries corresponding to stop words are first removed from the wordlist in step 300; then, in step 310, the wordlist is sorted. The total number of "important" words in the passage is computed by summing all the counts in the wordlist, as seen in step 320. Each word in the wordlist is processed separately, as indicated by loop symbol 330. For each word, the normalized word count is computed by dividing the count of that word by the total count for the passage, as seen in step 340. If this normalized word count exceeds a pre-defined threshold, the word is inserted into a tag cloud, with the display size of the word proportional to the normalized word count, as seen in step 350. For example, in tag cloud 102 of FIG. 1, "Vehicle" has the highest normalized word count and "planning" has the lowest normalized word count; in tag cloud 104 of FIG. 1, "Price" has the highest normalized word count and "car" has the lowest normalized word count.

Figure 6:
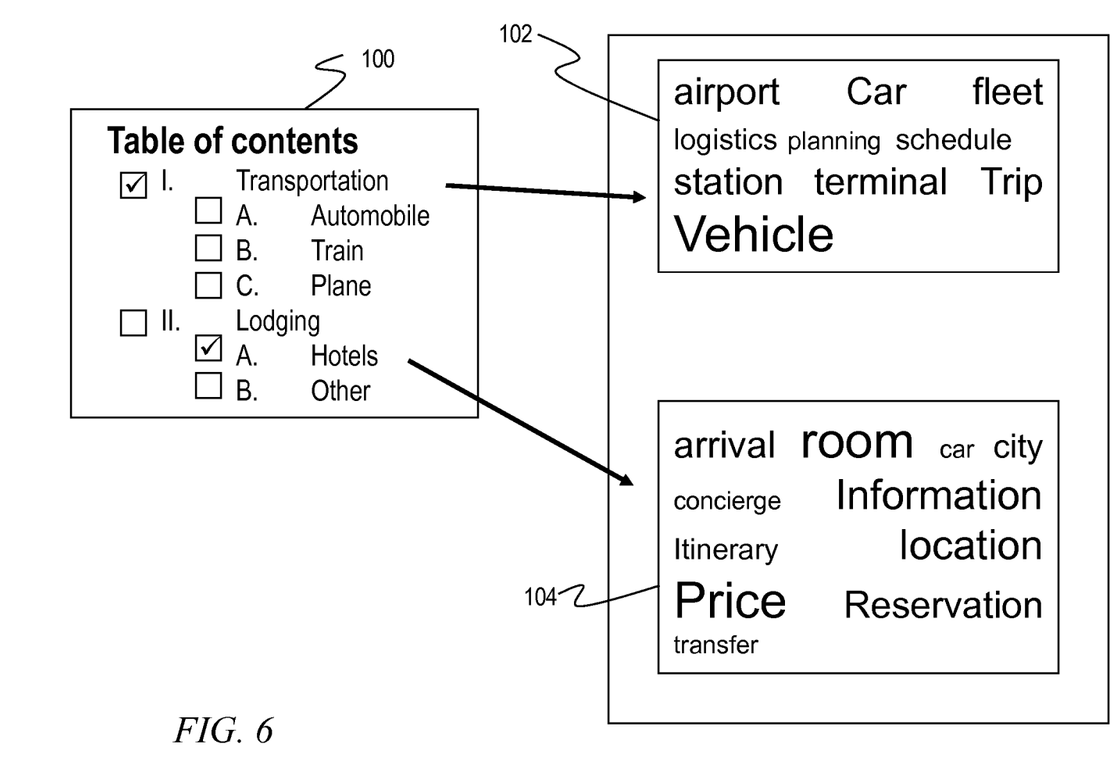
FIG. 6 shows an example of hierarchical tag clouds extracted from a document, similar to FIG. 1, with an alternative form of display indication.

Keyword groups, rendered as tag clouds, may be presented to the user in a variety of ways. One possibility is as "hover text" when the user's mouse or other pointing device is positioned over the associated portion of the document. For example, in FIG. 1, if the user's mouse is over "Transportation" in the table of contents, or over the corresponding portion in the body of the document, the tag cloud 102 is displayed as hover text to the user; if the user's mouse is over "Hotels" in the table of contents, or over the corresponding portion in the body of the document, the tag cloud 104 is displayed as hover text to the user. The mouse position in each case is represented as a plus sign (not separately numbered) to the left of "Transportation" and "Hotels" respectively. This permits the user to examine a summary in-context for any portion of the document. Since text within the document may be associated with multiple levels of the hierarchy (e.g. in a document which has section 1, 1.1, and 1.1.1 successively nested, text within section 1.1.1 is also contained within 1.1 and also within 1), one or more embodiments include mechanisms which allow the user to select the desired level (e.g., radio buttons, tabbed panes, button selectors, and the like), and/or to simultaneously view tag clouds associated with the multiple levels (e.g., via a linear visual sequence). An alternative representation that can be employed in one or more embodiments is a nested table-of-contents-like presentation, with each heading showing an associated tag cloud. Tree views of the tag cloud provide similar overviews. Interactive zooms are another option; the user can see a top level tag cloud, with some iconic representation of the sections within it. Acting on the nested icons (e.g., clicking or hovering) causes a zoom into the tag cloud associated with the inner level, containing its own sub-section icons. Many other visual presentations are possible. FIG. 6 shows a non-limiting example using check boxes (not separately numbered) to the left of each entry; in FIG. 6, the boxes next to "Transportation" and "Hotels" are checked off, causing display of tag clouds 102 and 104. Similar elements are numbered similarly in FIGS. 1 and 6.

Thus, one or more embodiments display a collection and/or sequence of key words extracted from a section of a hierarchical document; for example, in proximity to the label for that section in a hierarchical table of contents. In at least some instances, the sequence of key words is alphabetical, and/or the font size of a key word is a function of its frequency in the section.

In some cases, the sequence of key words corresponds to order of first occurrence in the section.

In some instances, the display is dynamic, shown when a mouse cursor or the like hovers over the corresponding entry in the table of contents.

In some embodiments, section displays are arranged next to the table of contents, optionally with lines running from each section display to the corresponding table of contents label (e.g., in FIG. 1, the arrow from "Transportation" to tag cloud 102 and the arrow from "Hotels" to tag cloud 104).

In some cases, selecting a key word (via mouse click, double-click, hover, or the like) causes highlighting of all entries in the table of contents containing that keyword.

Thus, one or more embodiments provide a method, computer program product, and/or apparatus for viewing hierarchical document summaries using tag clouds. Current document summarization techniques provide limited information to the user. Current summarization techniques include a set of keywords, which can be viewed in a variety of ways including tag clouds; textual summaries; and a table of contents, showing the hierarchical document structure. These techniques give a limited view of the document, either failing to reveal the hierarchical structure of the document (keywords or summaries), or failing to reveal detail (table of contents).

Advantageously, one or more embodiments retain a hierarchical structure, and provide summary detail at arbitrary levels of the document structure. One or more embodiments provide the ability to seamlessly navigate from a summary view to the source document via in-context viewing of summary information.

One or more embodiments employ hierarchically extracted keyword sets, visualized via tag clouds. One or more instances provide different levels of detail of document summaries, and/or optionally provide in-context viewing of the extracted sets.

In a non-limiting example, determine hierarchical structure of the document using header styles, indentation, bullet or numbering schemes, and/or other segmentation techniques. Extract keywords from each level of the hierarchy, associated with the corresponding document block. This yields a hierarchically nested set of keyword groups. In one or more instances, render the keyword groups as tag clouds, presented to the user in a variety of ways, for example:

Hover text when the user's mouse is positioned over the associated portion of the document (the user can be allowed to select the desired level, or all levels can be displayed).

Provide a nested table-of-contents-like presentation, with each heading showing an associated tag cloud.

Provide interactive zooms, wherein the user sees a top level tag cloud, with some iconic representation of the sections within it. Acting on nested icons (e.g., clicking or hovering) causes a zoom into the tag cloud associated with the inner level, containing its own sub-section icons.

Many other visual presentations are possible.

Figure 5:
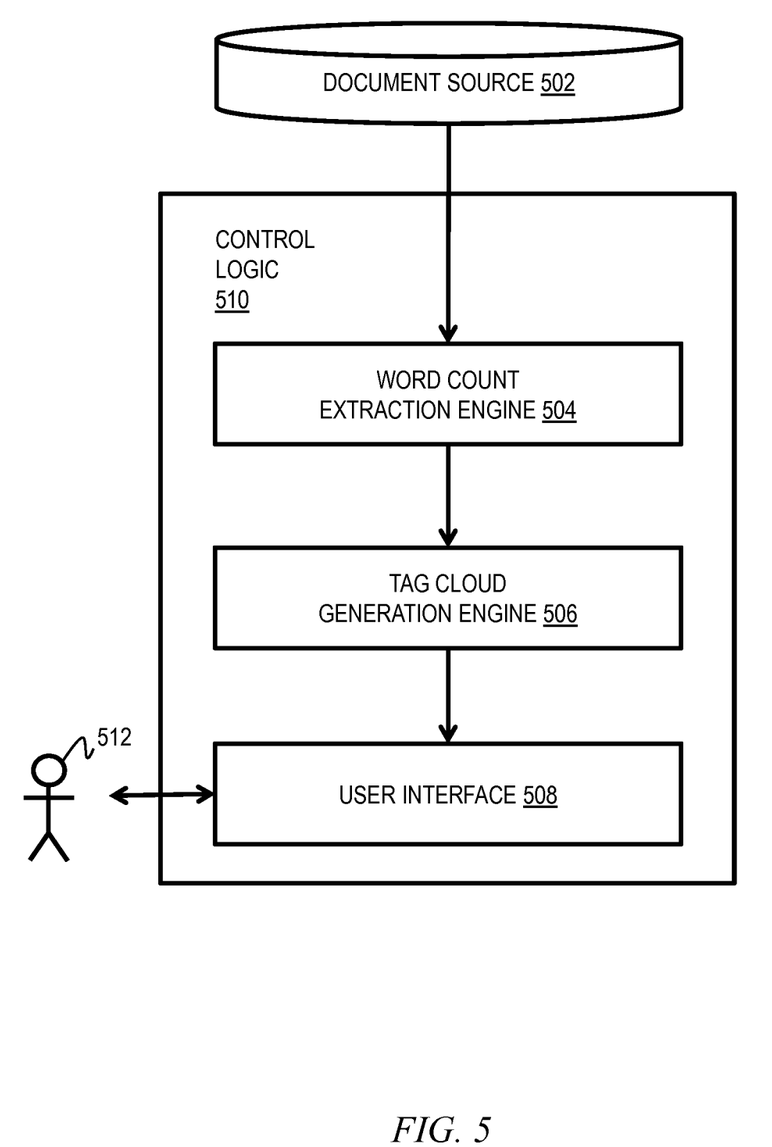
FIG. 5 shows an exemplary software architecture diagram.

FIG. 5 shows an exemplary software architecture diagram. Document source 502 includes a database, file system, web service, or the like. In this regard, one or more embodiments operate on hierarchically structured documents; tables of contents or the like may or may not be present. Where a table of contents is not present, it can be generated from the body of the hierarchically structured document. Word count extraction engine 504 represents computer instructions which implement the logic of steps 210, 230, 240, 250, 300, 310, and 320 of FIGS. 2 and 3, under control of control logic 510. Control logic 510 represents computer instructions which implement the looping logic in steps 200, 220, 330 in FIGS. 2 and 3. Tag cloud generation engine 506 represents computer instructions which implement the logic of steps 340 and 350 of FIG. 3. User interface 508 interacts with user 512 to present the results. In some embodiments, interface 508 may be a graphical user interface. Interface 508 may display all the tag clouds (i.e., for each hierarchical level) or only for selected hierarchical levels. User interface 508 may obtain input from user 512 (for example, mouse hovering as in FIG. 1 or check boxes as in FIG. 6) to select the desired tag clouds to display. Source 502 and interface may be implemented using various well-known techniques, given the teachings herein. Engine 504, engine 506, and logic 510 may be implemented, for example, in software modules written in Java or another suitable programming language.

Given the discussion thus far, it will be appreciated that, in general terms, an exemplary method, according to an aspect of the invention, includes the step of obtaining access to a hierarchically structured document having a plurality of hierarchical levels (e.g., as in the table of contents 100 in FIG. 1). The document may be obtained from document source 502. A further step includes, for each of the hierarchical levels, obtaining a word list with a word count for each word included therein; for example, as shown and described with respect to FIGS. 2 and 3, using, e.g., engine 504 controlled by control logic 510. In one or more embodiments, engine 504 implements the above-described logic from FIGS. 2 and 3 for each section of the hierarchical document. In one or more instances, this is done for every node in the hierarchical tree, both leaf and internal nodes.

An even further step includes, for each of the hierarchical levels, creating a tag cloud 102, 104 based on a corresponding one of the word counts, using, e.g., engine 506 controlled by control logic 510. A still further step includes displaying one or more of the tag clouds 102, 104 in association with a label for a corresponding one of the hierarchical levels (e.g., Transportation is the label that the cloud 102 is displayed in proximity to; Hotels is the label that the cloud 104 is displayed in proximity to). This step can be facilitated by the user interface 508.

In some cases, the step of creating the tag clouds includes some or all of the steps in FIG. 3. For example, in some instances, the step of creating the tag cloud includes, as per step 300, removing stop words from each of the word lists; as per step 320, determining a total number of words in each of the word lists; and, as per step 340, determining a normalized word count for each word, other than the stop words, in each of the word lists, by dividing a corresponding one of the word counts by the total number of words in a corresponding one of the lists. In such cases, the tag clouds are based on the normalized word counts.

Optionally, the step of creating the tag cloud further includes, as per step 350, for each given one of the words in each of the word lists, other than the stop words, comparing a corresponding one of the normalized word counts to a pre-defined threshold. Each given one of the words in each of the word lists is included in a corresponding one of the tag clouds, only if the pre-defined threshold is exceeded.

In some cases, the displaying step includes displaying given ones of the words in the tag clouds in a font size based on the normalized word count, as discussed above.

Optionally, the displaying step includes displaying given ones of the words in the tag clouds in alphabetical order, as seen at 102 in FIG. 1; however, the displaying step could include displaying given ones of the words in the tag clouds in order of occurrence in a corresponding one of the hierarchical levels (e.g., words in cloud 104 could have been displayed in their order of occurrence in the section "Hotels."

As noted, in some cases, the displaying step includes displaying dynamically in response to hovering over a corresponding one of the hierarchical levels. For example, a mouse or other pointing device hovers over "Transportation" to display cloud 102 or hovers over "Hotels" to display cloud 104.

Optionally, an additional step includes obtaining a user selection of an entry in a given one of the tag clouds. For example, a user clicks on "station" in tag cloud 102. Optionally, in response to obtaining the selection, all of the hierarchical levels containing the selected entry are highlighted. For example, "Transportation" is highlighted and if "station" also appears in the "Hotels" section, "Hotels" is also highlighted.

The displaying step could include simply displaying each of the tag clouds in association with a label for a corresponding one of the hierarchical levels; alternatively, displaying can be in response to a user selection of one or more corresponding hierarchical levels. The association between a tag cloud and a corresponding hierarchical level can be depicted in many ways; physical proximity is a non-limiting example.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
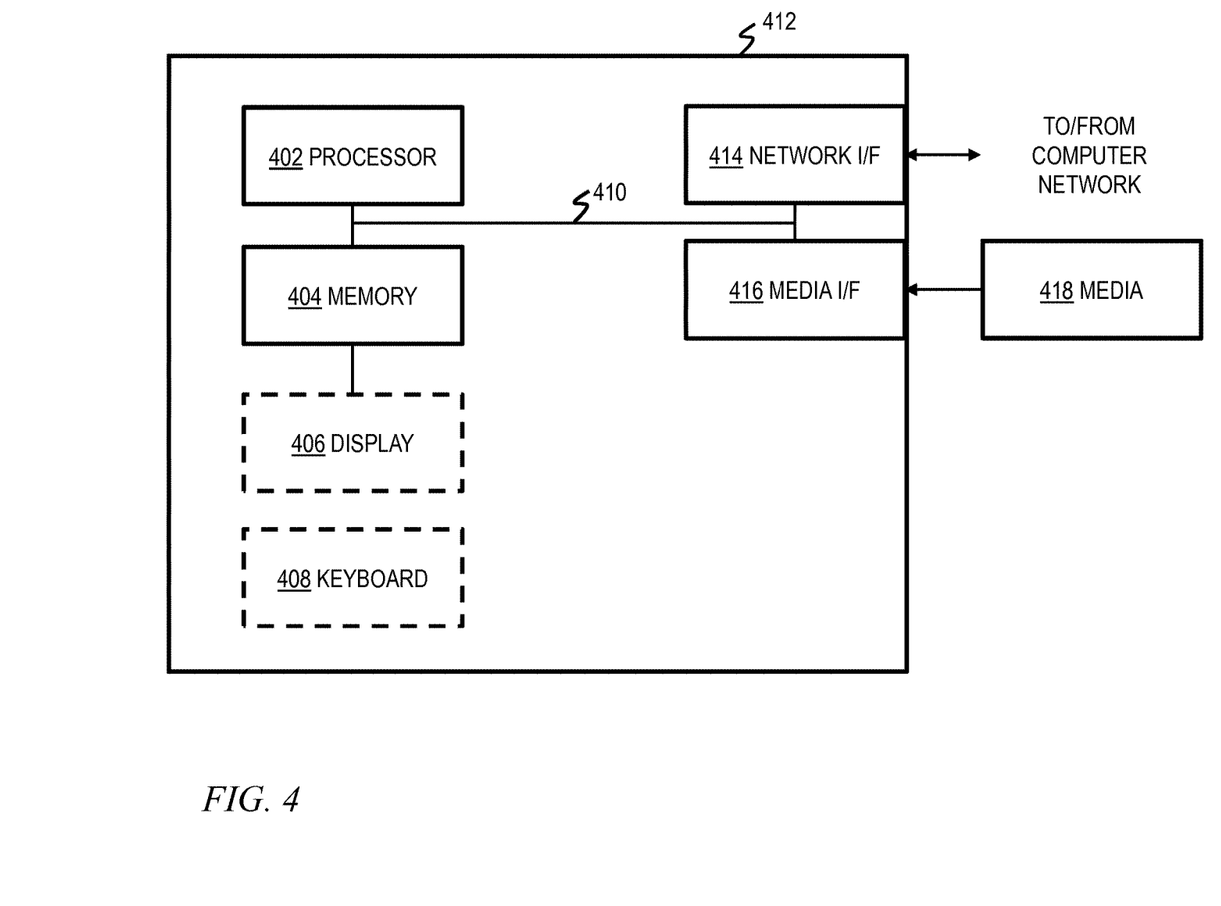
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a document source module, a word count extraction engine module, a tag cloud generation engine module, a control logic module, and a user interface module. The method steps can then be carried out using the distinct software modules and/or sub-modules of the system, as described above, executing on one or more hardware processors 402. The user interface module may work in conjunction with a display 406 and/or an associated screen buffer. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having computer readable program code embodied therewith for navigating a hierarchically structured document using iconic representations thereof displayed in a graphical user interface, said computer readable program code comprising:
   computer readable program code configured to obtain access to a hierarchically structured document having a plurality of hierarchical levels;
   computer readable program code configured to, for each of said hierarchical levels, obtain a word list with a word count for each word included therein;
   computer readable program code configured to, for each of said hierarchical levels, create a tag cloud based on said words in a respective one of said hierarchical levels and said word counts thereof;
   computer readable program code configured to display, in said graphical user interface, a table of contents including a plurality of labels associated with respective ones of said hierarchical levels;
   computer readable program code configured to facilitate display of a first tag cloud of said tag clouds in association with a first hierarchical level upon detecting a selection of a corresponding one of said plurality of labels associated with said first hierarchical level, wherein said display said first tag cloud includes a nested icon representing a second tag cloud of said tag clouds corresponding to a second hierarchical level at a different hierarchical level of said hierarchically structured document than said first hierarchical level, wherein said table of contents and said tag clouds are associated to display in-context visualization of information about select levels of said hierarchical structure document;

computer readable program code configured to obtain a selection of a given one of said words in said first tag cloud;

computer readable program code configured to highlight, in response to said selection of said given one of said words, all entries in said table of contents for said hierarchically structured document containing at least one instance of said given one of said words;

computer readable program code configured to receive a selection of said nested icon displayed in said first tag cloud; and computer readable program code configured to display said second tag cloud corresponding to said second hierarchical level of said hierarchically structured document upon detecting said selection of said nested icon, wherein said second tag cloud is displayed simultaneously with said first tag cloud.

2. The computer program product of claim 1, wherein said computer readable program code configured to create said tag cloud comprises:

computer readable program code configured to remove stop words from each of said word lists;

computer readable program code configured to determine a total number of words in each of said word lists; and computer readable program code configured to determine a normalized word count for each word, other than said stop words, in each of said word lists, by dividing a corresponding one of said word counts by said total number of words in a corresponding one of said lists;

wherein said tag clouds are based on said normalized word counts and wherein said first and second tag clouds are simultaneously displayed, wherein each displayed tag cloud is displayed in a relatively closer proximity to an associated label displayed in said table of contents than to a label displayed in said table of contents associated with a different displayed tag cloud.

3. The computer program product of claim 2, wherein said computer readable program code configured to create said tag cloud further comprises:

computer readable program code configured to, for each given one of said words in each of said word lists, other than said stop words, compare a corresponding one of said normalized word counts to a pre-defined threshold; and computer readable program code configured to include each given one of said words in each of said word lists in a corresponding one of said tag clouds, only if said pre-defined threshold is exceeded.

4. The computer program product of claim 2, wherein said computer readable program code configured to display comprises computer readable program code configured to display given ones of said words in said at least one of said tag clouds in a font size based on said normalized word count.

5. The computer program product of claim 2, wherein said computer readable program code configured to display comprises computer readable program code configured to display said words in said at least one of said tag clouds in alphabetical order.

* * * * *